US012603582B2

(12) United States Patent
Jung et al.

(10) Patent No.: US 12,603,582 B2
(45) Date of Patent: Apr. 14, 2026

(54) BIDIRECTIONAL LOW DC-DC CONVERTER INCLUDING LOSSLESS SNUBBER CIRCUIT, CONTROL METHOD OF BIDIRECTIONAL LDC AND BIDIRECTIONAL LDC SYSTEM

(71) Applicant: HL MANDO CORPORATION, Pyeongtaek-si (KR)

(72) Inventors: AnYeol Jung, Seoul (KR); Minseuk Oh, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 267 days.

(21) Appl. No.: 18/385,081

(22) Filed: Oct. 30, 2023

(65) Prior Publication Data

US 2024/0204672 A1      Jun. 20, 2024

(30) Foreign Application Priority Data

Dec. 16, 2022    (KR) ........................ 10-2022-0176963

(51) Int. Cl.
H02M 3/335        (2006.01)
H02M 1/34         (2007.01)

(52) U.S. Cl.
CPC ....... H02M 3/33584 (2013.01); H02M 1/342 (2021.05); H02M 3/33592 (2013.01); H02M 1/34 (2013.01)

(58) Field of Classification Search
CPC ............. H02M 1/342; H02M 3/33584; H02M 3/33592
See application file for complete search history.

(56) References Cited

U.S. PATENT DOCUMENTS

| | | | |
|---|---|---|---|
| 6,771,521 B1 | 8/2004 | Xiong | |
| 2006/0139823 A1* | 6/2006 | Shoji ........................ | H02M 1/34 |
| | | | 361/56 |
| 2007/0053217 A1* | 3/2007 | Darroman ............. | H02M 3/158 |
| | | | 363/62 |
| 2011/0037319 A1* | 2/2011 | Matsui .............. | H02M 3/33584 |
| | | | 307/43 |
| 2014/0334189 A1* | 11/2014 | Yan ................... | H02M 3/33584 |
| | | | 363/17 |

FOREIGN PATENT DOCUMENTS

| | | |
|---|---|---|
| JP | 2015-070716 A | 4/2025 |
| KR | 10-2016-0069440 A | 6/2016 |
| KR | 10-2022-0085934 A | 6/2022 |

OTHER PUBLICATIONS

Office Action From Korean Patent Office Dated Dec. 10, 2025, Issued for Korean Patent Application No. 10-2022-0176963.

* cited by examiner

*Primary Examiner* — Jue Zhang
(74) *Attorney, Agent, or Firm* — Harvest IP Law, LLP

(57)        ABSTRACT
According to an embodiment of the present disclosure, provided is a bidirectional LDC (Low DC-DC Converter) having opposite ends connected to a high voltage battery and a low voltage battery, respectively, and including a lossless snubber circuit, wherein, when any one of a first synchronous rectifier and a second synchronous rectifier is turned on, a voltage of a low voltage side connected to the low voltage battery is stepped up and transmitted to a high voltage side connected to the high voltage battery. When the first synchronous rectifier and the second synchronous rectifier are turned off, a first switch of the lossless snubber circuit is turned on to perform a voltage clamping operation and a freewheeling operation.

20 Claims, 4 Drawing Sheets

PRIOR ART

BIDIRECTIONAL LOW DC-DC CONVERTER INCLUDING LOSSLESS SNUBBER CIRCUIT, CONTROL METHOD OF BIDIRECTIONAL LDC AND BIDIRECTIONAL LDC SYSTEM

CROSS-REFERENCE TO RELATED APPLICATION

The present application claims priority to Korean Patent Application No. 10-2022-0176963, filed Dec. 16, 2022, the entire contents of which is incorporated herein for all purposes by this reference.

BACKGROUND

1. Field of the Invention

The present disclosure relates to a bidirectional Low DC-DC Converter ("LDC"), a method for controlling a bidirectional LDC, and a bidirectional LDC system.

2. Discussion of Related Art

Most electric components, for example, a headlamp, a wiper, a controller, etc., mounted to a vehicle to which an internal combustion engine is applied, operate at a voltage of 12 V. These specifications are equally applied to a plug-in hybrid vehicle ("PHEV") or an electric vehicle ("EV") system to which an integrated charging control unit ("ICCU") is applied.

The conventional ICCU has developed a unidirectional LDC that charges a low voltage battery (for example, 12 V) charges electric components by receiving power from a high voltage battery.

However, recently, since requirements for charging a high voltage battery using a low voltage battery have been made due to various reasons such as redundancy of the ICCU, the trend is to develop LDC from unidirectional to bidirectional.

Meanwhile, a synchronous rectifier ("SR") is applied so that a low voltage side of the LDC can operate while lowering a cost, and a high spike voltage is applied to the synchronous rectifier while a current path is interrupted in a period of less than 0.5 of a switching duty during a step-up operation in a bidirectional LDC, thereby causing a problem that the synchronous rectifier is damaged by a fire.

In the case of the conventional LDC illustrated in FIG. 1, it includes a protection circuit 10 including a diode, a resistor, and a capacitor to operate without a problem even in a period of less than 0.5 of a switching duty of the synchronous rectifier.

However, the conventional protection circuit 10 has a problem in that efficiency is lowered due to loss and heat generation because current continuously flows through the internal resistance. In addition, when a resistance value of an internal resistor is mis-designed, there is a problem that the synchronous rectifier, as well as the protection circuit 10, and furthermore the LDC are damaged by a fire.

SUMMARY OF THE INVENTION

The present disclosure is directed to providing a bidirectional LDC, a method for controlling a bidirectional LDC, and a bidirectional LDC system that prevents circuit damage by a fire without loss, even when the bidirectional LDC performs a step-up operation.

The present disclosure is directed to providing a bidirectional LDC, a method for controlling a bidirectional LDC, and a bidirectional LDC system that are more durable.

According to an embodiment of the present disclosure, provided is a bidirectional LDC (Low DC-DC Converter) having opposite ends connected to a high voltage battery and a low voltage battery, respectively, and comprising a lossless snubber circuit, wherein the bidirectional LDC may: when any one of a first synchronous rectifier and a second synchronous rectifier is turned on, boost a voltage of a low voltage side connected to the low voltage battery and transmit the voltage to a high voltage side connected to the high voltage battery; and when the first synchronous rectifier and the second synchronous rectifier are turned off, turn a first switch of the lossless snubber circuit on to perform a voltage clamping operation and a freewheeling operation.

The lossless snubber circuit may include the first switch, a voltage clamping circuit connected to a front end of the first switch and including two diodes and a first capacitor, and a freewheeling circuit connected to a rear end of the first switch, including one diode and an inductor.

The bidirectional LDC may further include a second capacitor, connected in parallel with the high voltage side and configured to charge a supplied voltage, a first switching unit connected in parallel with the second capacitor and comprising a plurality of switches configured as a full-bridge, a second switching unit comprising the first synchronous rectifier and the second synchronous rectifier, a transformer comprising a primary coil connected to the first switching unit and a secondary coil connected to the second switching unit, and a third capacitor connected in parallel with the low voltage side and configured to charge a supplied voltage.

The bidirectional LDC is characterized in that when the second switching unit is turned on in a step-up mode, a voltage charged to the third capacitor is stepped up by the transformer and transmitted to the second capacitor.

The bidirectional LDC is characterized in that when the first switching unit performs a full-bridge operation in a step-down mode, a voltage charged to the second capacitor is stepped down by the transformer and transmitted to the third capacitor.

The bidirectional LDC is characterized in that when the second switching unit is turned off, a induced voltage generated by the transformer is clamped by the voltage clamping circuit to a first voltage corresponding to the first capacitor as the first switch is turned on.

The bidirectional LDC is characterized in that when the second switching unit is turned on, a residual current flows through a loop composed of the freewheeling circuit and the third capacitor.

The first synchronous rectifier, the second synchronous rectifier, and the first switch may be turned on or off based on a control signal received from a processor.

When a switching duty of the first synchronous rectifier and the second synchronous rectifier is less than 0.5, the first switch may be turned on based on a control signal received from the processor.

According to an embodiment of the present disclosure, provided is a method for controlling a bidirectional LDC (Low DC-DC Converter) having opposite ends connected to a high voltage battery and a low voltage battery, respectively, and comprising a lossless snubber circuit, including: stepping up a voltage of a low voltage side connected to the low voltage battery and transmitting to a high voltage side connected to the high voltage battery when any one of a first synchronous rectifier and a second synchronous rectifier is turned on: and turning on a first switch of the lossless snubber circuit to perform a voltage clamping operation and a freewheeling operation when the first synchronous rectifier and the second synchronous rectifier are turned off.

The step of transmitting to a high voltage side may include stepping up, by the transformer, a voltage charged to the third capacitor and transmitting to the second capacitor when the second switching unit is turned on in a step-up mode.

The method for controlling may further include stepping down, by the transformer, a voltage charged to the second capacitor and transmitting to the third capacitor when the first switching unit performs a full-bridge operation in a step-down mode.

The step of performing a voltage clamping operation and a freewheeling operation may include, when the second switching unit is turned off, clamping, by the voltage clamping circuit, an induced voltage generated by the transformer to a first voltage corresponding to the first capacitor as the first switch is turned on.

According to an embodiment of the present disclosure, provided is a bidirectional LDC (Low DC-DC Converter) system, comprising a bidirectional LDC configured to: step up a voltage of a low voltage side connected to a low voltage battery and transmit to a high voltage side connected to a high voltage battery when any one of a first synchronous rectifier and a second synchronous rectifier is turned on, and turn on a first switch of a lossless snubber circuit to perform a voltage clamping operation and a freewheeling operation when the first synchronous rectifier and the second synchronous rectifier are turned off: and a processor configured to control the first synchronous rectifier, the second synchronous rectifier, and the first switch to be turned on or off.

The processor may be configured to identify a switching duty of the first synchronous rectifier and the second synchronous rectifier according to a voltage of the high voltage battery and the low voltage battery, respectively, and activate the lossless snubber circuit when the switching duty is less than 0.5.

According to an embodiment of the present disclosure, even when the bidirectional LDC performs a step-up operation, energy efficiency can be increased by reducing energy loss or heat generation of the circuit, and quality can be increased by maintaining the internal temperature of the integrated charging control unit constantly.

According to an embodiment of the present disclosure, even when the bidirectional LDC performs a step-up operation, product quality can be increased by preventing circuit damage by a fire.

According to an embodiment of the present disclosure, efficiency of the bidirectional LDC can be increased, durability of the product may be secured in a long time, and mass production quality can be improved.

DETAILED DESCRIPTION OF EXEMPLARY EMBODIMENTS

Figure 1:
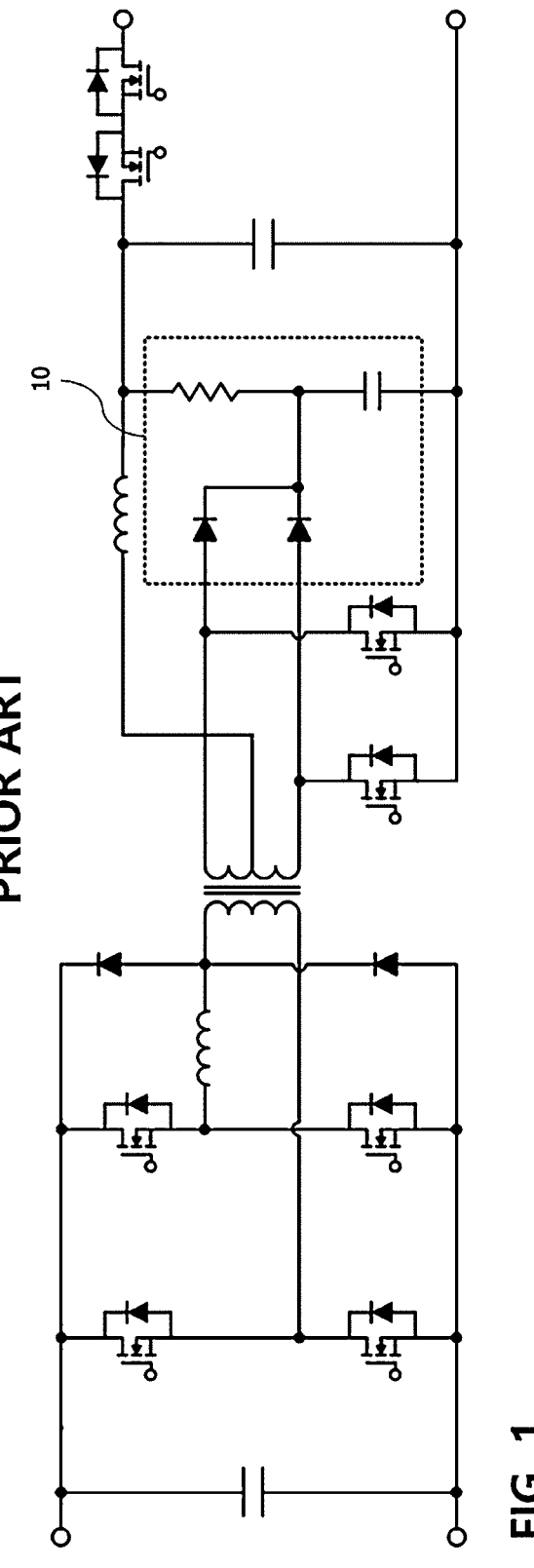
FIG. 1 is a diagram illustrating a conventional LDC.

Hereinafter, embodiments according to the present disclosure will be described in detail with reference to the accompanying drawings. The detailed description to be disclosed hereinafter with the accompanying drawings is intended to describe exemplary embodiments of the present disclosure and is not intended to represent the only embodiments in which the present disclosure may be implemented. In the drawings, parts unrelated to the description may be omitted for clarity of description of the present disclosure, and like reference numerals may designate like elements throughout the specification. In addition, in the embodiment of the present disclosure, terms including ordinal numbers such as first and second are used only for the purpose of distinguishing one component from another, and expressions in the singular include plural expressions unless the context clearly indicates otherwise.

Figure 2:
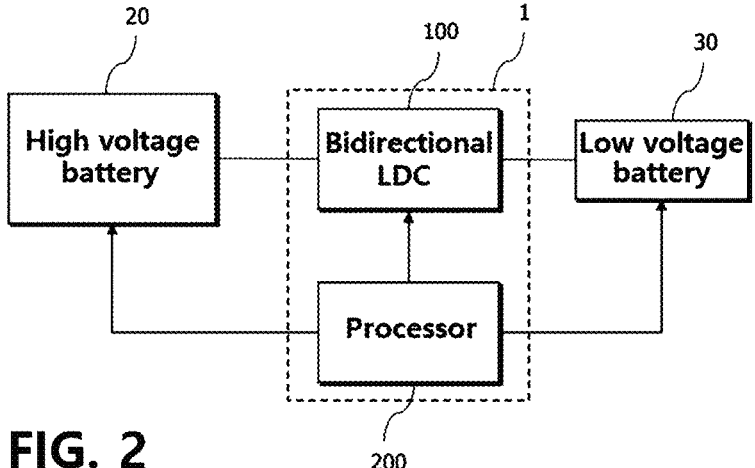
FIG. 2 is a schematic diagram illustrating a bidirectional LDC system according to an exemplary embodiment of the present disclosure.

FIG. 2 is a schematic diagram illustrating a bidirectional LDC system according to an exemplary embodiment of the present disclosure.

Referring to FIG. 2, a bidirectional LDC system 1 (hereinafter, referred to as a system 1) includes a bidirectional LDC 100 and a processor 200.

The bidirectional LDC 100 is a device that has one end connected to a high voltage battery 20 and the other end connected to a low voltage battery 30 to mutually convert voltages at opposite ends to supply power and charge the battery. A more specific configuration and circuit structure of the bidirectional LDC 100 will be described with reference to FIG. 3.

The processor 200 may execute software, such as a program, to control at least one other component (e.g., hardware or software component) of the vehicle, and may perform various data processing or calculations. In particular, the processor 200 may be mounted in an integrated charging control unit or a battery management system to control overall operations of the bidirectional LDC 100.

The processor 200 may be an electronic control unit (ECU), a micro control unit (MCU), or a microprocessor. Further, the processor 200 may execute software, such as a program, to control at least one other component (e.g., hardware or software component) in the vehicle, and may perform various data processing or calculations. In addition, the processor 200 may communicate with other components in the ICCU or other components in the vehicle by using CAN communication, LIN communication, etc.

Meanwhile, although FIG. 2 illustrates that each of the high voltage battery 20 and the low voltage battery 30 connected to the bidirectional LDC 100 is one, they are not limited thereto, and a plurality of high voltage batteries and/or a plurality of low voltage batteries may be connected to the bidirectional LDC 100. Alternatively, the bidirectional LDC 100 may be mounted for each high voltage battery and/or each low voltage battery in the integrated charging control unit. Hereinafter, for convenience of description, it will be described assuming that one high voltage battery 20 and one low voltage battery 30 are connected to each end of the bidirectional LDC 100.

The processor 200 may receive a request signal for performing a step-down operation or a step-up operation from the high voltage battery 20, the low voltage battery 30, or other components of the vehicle, or may identify that the step-down operation or the step-up operation needs to be performed under a specific condition.

Hereinafter, in the present disclosure, when the step-down operation is performed, it is also referred to as a step-down mode, and when the step-up operation is performed, it is also referred to as a step-up mode.

As described above, the LDC was able to convert the high voltage of the high voltage battery into a low voltage to supply it to electric components or supply power in one direction by a device that charges the low voltage battery. However, recently, a bidirectional LDC for charging a high voltage battery even with a low voltage battery has been developed, and thus it has become possible not only a step-down operation but also a step-up operation.

The present disclosure proposes a bidirectional LDC 100 including a lossless snubber capable of efficiently preventing a spark that may occur in a switch of a low voltage side during a step-up process of the bidirectional LDC without damage by a fire to a device.

Hereinafter, a configuration and an operation of the bidirectional LDC 100 according to an embodiment of the present disclosure will be described in detail with reference to the accompanying drawings.

Figure 3:
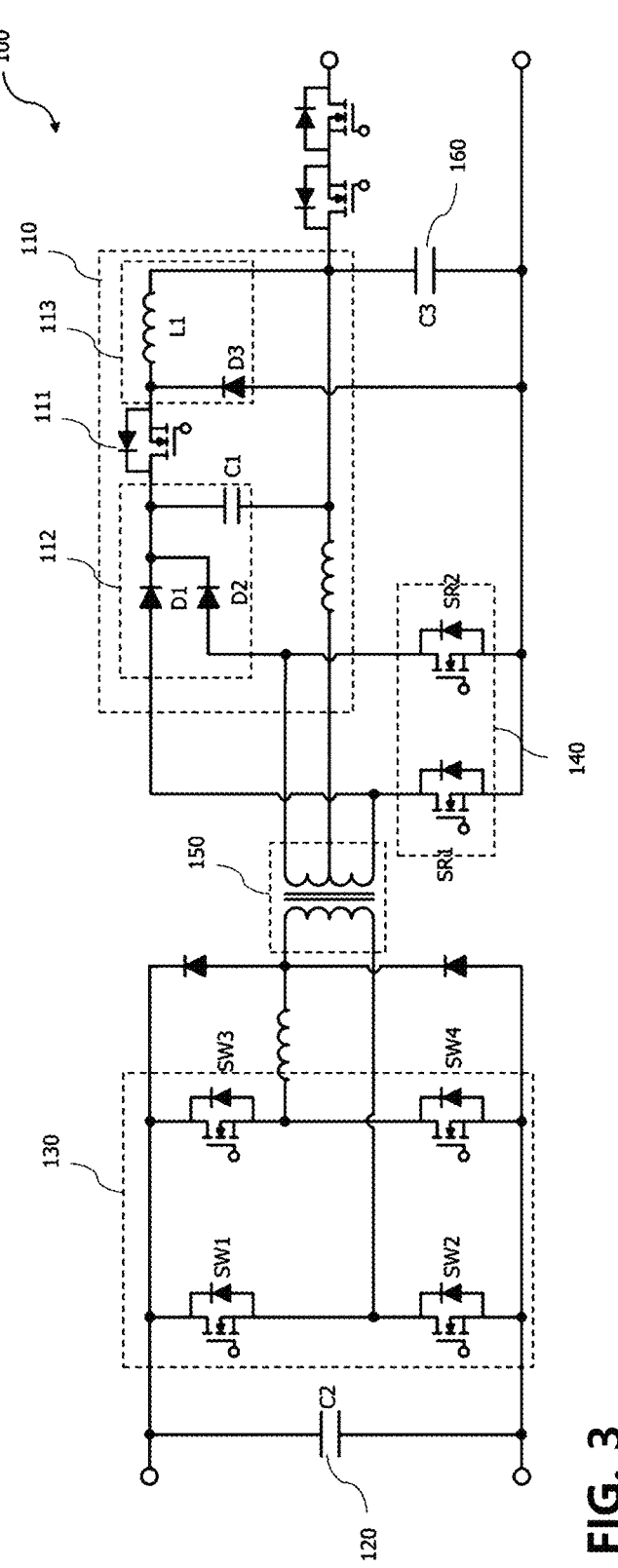
FIG. 3 is a diagram illustrating a bidirectional LDC according to an exemplary embodiment of the present disclosure.

FIG. 3 is a diagram illustrating a bidirectional LDC 100 according to an exemplary embodiment of the present disclosure.

The bidirectional LDC 100 largely includes a lossless snubber circuit 110, a capacitor C2 120 connected in parallel with a high voltage side (referred to as a second capacitor 120), a first switching unit 130, a second switching unit 140, a transformer 150, and a capacitor C3 160 connected in parallel with a low voltage side (referred to as a third capacitor 160).

According to an embodiment of the present disclosure, the lossless snubber circuit 110 is a circuit for performing a voltage clamping operation and a freewheeling operation, and includes a first switch 111, a voltage clamping circuit 112 connected to a front end of the first switch 111, and a freewheeling circuit 113 connected to a rear end of the first switch 111.

The bidirectional LDC 100 turns on the first switch 111 when an operation of the lossless snubber circuit 110 is required during a step-up operation. In this case, the bidirectional LDC 100 may receive a control signal for turning on the first switch 111 of the lossless snubber circuit 110 from the processor 200. The first switch 111 may be implemented as a MOSFET switch.

The processor 200 identifies a switching duty of the first switch 111, the first switching unit 130, and the second switching unit 140 by using power of the high voltage battery 20, a voltage and power of the low voltage battery 30, and controls each switch to be turned on or off by generating a control signal according to the switching duty. When the switching duty of the second switching unit 140 is less than 0.5, the processor 200 may activate the lossless snubber circuit 110.

The voltage clamping circuit 112 is connected to a front end of the first switch 111, and includes two diodes DI and D2 and a first capacitor C1. The freewheeling circuit 113 is connected to a rear end of the first switch 111, and includes one diode D3 and an inductor L1.

The operation of the voltage clamping circuit 112 and the freewheeling circuit 113 will be described with reference to FIG. 4.

The second capacitor 120 is connected in parallel with a high voltage side, and charges a voltage received from the high voltage battery 20 connected to the high voltage side during a step-down operation or receives a voltage stepped up from the low voltage battery 30 connected to a low voltage side during a step-up operation.

The first switching unit 130 is connected in parallel with the second capacitor 120, and includes a plurality of switches SW1, SW2, SW3, and SW4 configured as a full-bridge. The plurality of switches SW1, SW2, SW3, and SW4 may be implemented as a MOSFET switch, and may be controlled by a phase shift control method.

In the first switching unit 130, sequentially 1) SW1 and SW4 are turned on (SW2 and SW3 are turned off), 2) SW1 and SW3 are turned on (SW2 and SW4 are turned off), 3) SW2 and SW3 are turned on (SW1 and SW4 are turned off), and 4) SW2 and SW4 are turned on (SW1 and SW3 are turned off).

As described above, the sequential switching operation is referred to as a full-bridge operation, and the bidirectional LDC 100 continuously repeats the full-bridge operation and transmits power received from the high voltage battery 20 to the transformer 150, or transmits power received from the transformer 150 to the high voltage battery 20 to charge the high voltage battery 20.

When the first switching unit 130 performs the full-bridge operation, the voltage charged to the second capacitor 120 in the step-down mode is stepped down by the transformer 150 and transmitted to the third capacitor 160. The second switching unit 140 performs the on operation during this process.

The second switching unit 140 includes a first synchronous rectifier SR1 and a second synchronous rectifier SR2.

According to an embodiment of the present disclosure, when any one of the first synchronous rectifier SR1 and the second synchronous rectifier SR2 is turned on, the voltage of the low voltage side connected to the low voltage battery 30 is stepped up in the step-up mode and transmitted to the high voltage side connected to the high voltage battery 20. Similarly, it is natural that the first switching unit 130 performs the full-bridge operation during this process.

Specifically, when the second switching unit 140 is turned on in the step-up mode, the voltage charged to the third capacitor 160 is stepped up by the transformer 150 and transmitted to the second capacitor 120 through the full-bridge operation of the first switching unit 130.

In this case, the first synchronous rectifier SR1 and the second synchronous rectifier SR2 may simultaneously turn on according to the switching duty per switch identified by the processor 200.

On the other hand, when the first synchronous rectifier SR1 and the second synchronous rectifier SR2 are both turned off according to the switching duty per switch identified by the processor 200, an impulse voltage is generated due to the induced current by the inductor. Since the impulse voltage generated at this time has a very high value compared to the power supply voltage, it may damage circuits, particularly, the synchronous rectifier, or generate noise.

To mitigate this, according to an embodiment of the present disclosure, when the first synchronous rectifier SR1 and the second synchronous rectifier SR2 are turned off, the first switch 111 of the lossless snubber circuit 110 is turned on to perform a voltage clamping operation and a freewheeling operation.

In this case, it is described that the second switching unit 140 is turned on when any one of the first synchronous rectifier SR1 and the second synchronous rectifier SR2 is turned on, and the second switching unit 140 is turned off when the first synchronous rectifier SR1 and the second synchronous rectifier SR2 are both turned off.

The transformer 150 includes a primary coil connected to the first switching unit 130 and a secondary coil connected to the second switching unit 140, and performs the step-up or step-down operation according to the number of windings of the coil.

The third capacitor 160 is connected in parallel with a low voltage side, and receives a voltage stepped up from the high voltage battery 20 connected to the high voltage side during a step-down operation or charges a voltage received from the low voltage battery 30 connected to a low voltage side during a step-up operation.

In addition, the bidirectional LDC 100 may further include a choke coil that prevents the passage of a relatively high frequency current and only passes a direct current or a relatively low frequency current.

Figure 4:
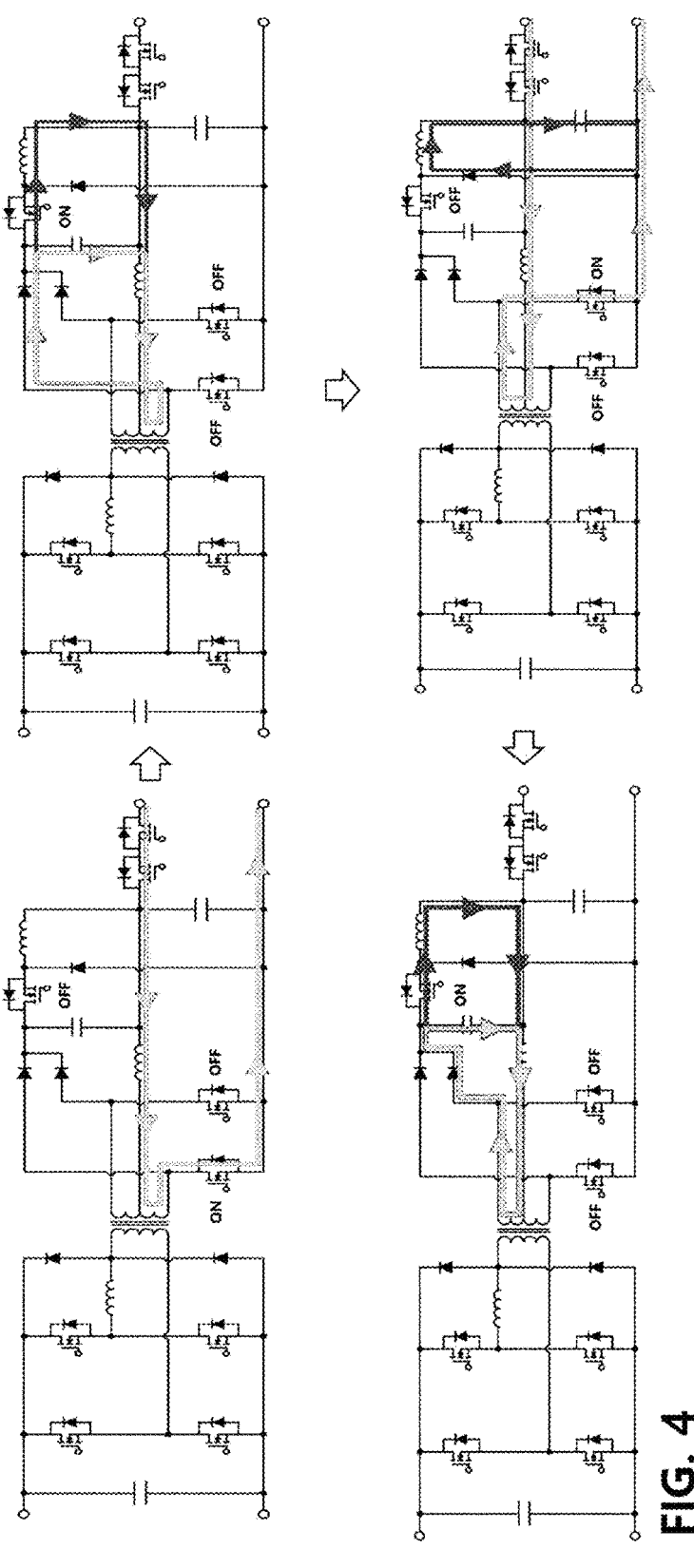
FIG. 4 is a diagram illustrating an operation state of a bidirectional LDC according to an exemplary embodiment of the present disclosure.

FIG. 4 is a diagram illustrating an operation state of a bidirectional LDC according to an exemplary embodiment of the present disclosure.

FIG. 4 illustrates an operation process when the bidirectional LDC 100 is in the step-up mode. In this case, the circuit configuration of the bidirectional LDC 100 is the same as that of FIG. 3, and thus, reference numbers and functions of each configuration refer to the contents described with reference to FIG. 3.

First, referring to the upper left circuit of FIG. 4, the first synchronous rectifier SR1 is turned on and the second synchronous rectifier SR2 is turned off so that power is transferred from the low voltage battery 30 to the transformer 150. In this case, the first switch 111 of the lossless snubber circuit 110 is turned off.

Then, when the first synchronous rectifier SR1 and the second synchronous rectifier SR2 are turned off in the upper right circuit, the first switch 111 is turned on. As described above, the turning on/off operations of the first synchronous rectifier SR1 and the second synchronous rectifier SR2 are determined by a switching duty, and in general, when the switching duty of the first synchronous rectifier SR1 and the second synchronous rectifier SR2 is less than 0.5, the first synchronous rectifier SR1 and the second synchronous rectifier SR2 are both turned off.

In this case, when both the first synchronous rectifier SR1 and the second synchronous rectifier SR2 are turned off, an induced electromotive force (induced voltage) is generated by the transformer. The induced voltage generated is clamped by the voltage clamping circuit 112 to a first voltage corresponding to the first capacitor C1 as the first switch 111 is turned on, and the current is gradually dissipated while passing through the voltage clamping circuit 112 and the freewheeling circuit 113. In this case, the path through which the current flows is referred to as a freewheeling path.

According to an embodiment of the present disclosure, since a resistance element is not included in the voltage clamping circuit 112 and the freewheeling circuit 113, there is no concern that heat is generated or the circuit is damaged by a fire based on a resistance design.

Then, in the lower right circuit, the first synchronous rectifier SR1 is turned off and the second synchronous rectifier SR2 is turned on so that power is transferred from the low voltage battery 30 to the transformer 150. In this case, the first switch 111 of the lossless snubber circuit 110 is turned off.

As such, when the second switching unit 140 is turned on again, a residual current flows in a loop composed of the freewheeling circuit 113 and the third capacitor 160. The residual current is a current that has not yet been dissipated after the current generated as the second switching unit 140 is turned off and flows in the lossless snubber circuit 110. As the first switch 111 is turned off, the remaining current naturally flows through a loop composed of the freewheeling circuit 113 and the third capacitor 160. Even in this case, since a resistance element is not included in the circuit, there is no concern that heat is generated or the circuit is damaged by a fire based on a resistance design.

Then, when the first synchronous rectifier SR1 and the second synchronous rectifier SR2 are turned off in the lower left circuit, like the upper right circuit, the first switch 111 is turned on.

The induced electromotive force generated as the second switching unit 140 is turned off is clamped to a first voltage corresponding to the first capacitor C1 in the voltage clamping circuit 112, and the current is gradually dissipated while passing through the voltage clamping circuit 112 and the freewheeling circuit 113. In this case, the residual current that is not completely dissipated may flow in a loop composed of the freewheeling circuit 113 and the third capacitor 160 when the second switching unit 140 is turned on again.

According to an embodiment of the present disclosure, the operation flow illustrated in FIG. 4 is merely one example of various operation processes, and is not limited to FIG. 4. Therefore, various cases may occur, such as that the first synchronous rectifier SR1 and the second synchronous rectifier SR2 of the second switching unit 140 are alternately continuously turned on/off, or that both the first synchronous rectifier SR1 and the second synchronous rectifier SR2 of the second switching unit 140 are turned on.

According to an embodiment of the present disclosure, even when the bidirectional LDC performs a step-up operation, energy efficiency can be increased by reducing energy loss or heat generation of the circuit, and quality can be increased by maintaining the internal temperature of the integrated charging control unit constantly.

According to an embodiment of the present disclosure, even when the bidirectional LDC performs a step-up operation, product quality can be increased by preventing circuit damage by a fire.

According to an embodiment of the present disclosure, efficiency of the bidirectional LDC can be increased, durability of the product may be secured in a long time, and mass production quality can be improved.

What is claimed is:

1. A bidirectional LDC (Low DC-DC Converter) having opposite ends connected to a high voltage battery and a low voltage battery, respectively, and comprising a lossless snubber circuit, wherein the bidirectional LDC is configured to:

when any one of a first synchronous rectifier and a second synchronous rectifier is turned on, boost a voltage of a low voltage side connected to the low voltage battery and transmit the voltage to a high voltage side connected to the high voltage battery; and when the first synchronous rectifier and the second synchronous rectifier are turned off, turn a first switch of the lossless snubber circuit on to perform a voltage clamping operation and a freewheeling operation.

2. The bidirectional LDC of claim 1, wherein the lossless snubber circuit comprises:

the first switch;

a voltage clamping circuit connected to a front end of the first switch and including two diodes and a first capacitor; and a freewheeling circuit connected to a rear end of the first switch and including one diode and an inductor.

3. The bidirectional LDC of claim 2 further comprising:

a second capacitor connected in parallel with the high voltage side and configured to charge a supplied voltage;

a first switching unit connected in parallel with the second capacitor and comprising a plurality of switches configured as a full-bridge;

a second switching unit comprising the first synchronous rectifier and the second synchronous rectifier;

a transformer comprising a primary coil connected to the first switching unit and a secondary coil connected to the second switching unit; and a third capacitor connected in parallel with the low voltage side and configured to charge a supplied voltage.

4. The bidirectional LDC of claim 3, wherein when the second switching unit is turned on in a step-up mode, a voltage charged to the third capacitor is stepped up by the transformer and transmitted to the second capacitor.

5. The bidirectional LDC of claim 3, wherein when the first switching unit performs a full-bridge operation in a step-down mode, a voltage charged to the second capacitor is stepped down by the transformer and transmitted to the third capacitor.

6. The bidirectional LDC of claim 3, wherein when the second switching unit is turned off, an induced voltage generated by the transformer is clamped by the voltage clamping circuit to a first voltage corresponding to the first capacitor as the first switch is turned on.

7. The bidirectional LDC of claim 3, wherein when the second switching unit is turned on, a residual current flows through a loop composed of the freewheeling circuit and the third capacitor.

8. The bidirectional LDC of claim 1, wherein the first synchronous rectifier, the second synchronous rectifier, and the first switch are turned on or off based on a control signal received from a processor.

9. The bidirectional LDC of claim 8, wherein when a switching duty of the first synchronous rectifier and the second synchronous rectifier is less than 0.5, the first switch is turned on based on a control signal received from the processor.

10. A method for controlling a bidirectional LDC (Low DC-DC Converter) having opposite ends connected to a high voltage battery and a low voltage battery, respectively, and comprising a lossless snubber circuit, comprising:

stepping up a voltage of a low voltage side connected to the low voltage battery and transmitting the voltage to a high voltage side connected to the high voltage battery when any one of a first synchronous rectifier and a second synchronous rectifier is turned on; and turning on a first switch of the lossless snubber circuit to perform a voltage clamping operation and a freewheeling operation when the first synchronous rectifier and the second synchronous rectifier are turned off.

11. The method for controlling a bidirectional LDC of claim 10, wherein the lossless snubber circuit comprises:

the first switch;

a voltage clamping circuit connected to a front end of the first switch and including two diodes and a first capacitor; and a freewheeling circuit connected to a rear end of the first switch and including one diode and an inductor.

12. The method for controlling a bidirectional LDC of claim 11, wherein the bidirectional LDC further comprises:

a second capacitor connected in parallel with the high voltage side and configured to charge a supplied voltage;

a first switching unit connected in parallel with the second capacitor and comprising a plurality of switches configured as a full-bridge;

a second switching unit comprising the first synchronous rectifier and the second synchronous rectifier;

a transformer comprising a primary coil connected to the first switching unit and a secondary coil connected to the second switching unit; and a third capacitor connected in parallel with the low voltage side and configured to charge a supplied voltage.

13. The method for controlling a bidirectional LDC of claim 12, wherein the step of transmitting to a high voltage side comprises stepping up, by the transformer, a voltage charged to the third capacitor and transmitting to the second capacitor when the second switching unit is turned on in a step-up mode.

14. The method for controlling a bidirectional LDC of claim 12, further comprising stepping down, by the transformer, a voltage charged to the second capacitor and transmitting to the third capacitor when the first switching unit performs a full-bridge operation in a step-down mode.

15. The method for controlling a bidirectional LDC of claim 12, wherein the step of performing a voltage clamping operation and a freewheeling operation comprises, when the second switching unit is turned off, clamping, by the voltage clamping circuit, an induced voltage generated by the transformer to a first voltage corresponding to the first capacitor as the first switch is turned on.

16. The method for controlling a bidirectional LDC of claim 12, wherein when the second switching unit is turned on, a residual current flows through a loop composed of the freewheeling circuit and the third capacitor.

17. The method for controlling a bidirectional LDC of claim 10, wherein the first synchronous rectifier, the second synchronous rectifier, and the first switch are turned on or off based on a control signal received from a processor control method.

18. The method for controlling a bidirectional LDC of claim 17, wherein when a switching duty of the first synchronous rectifier and the second synchronous rectifier is less than 0.5, the first switch is turned on based on a control signal received from the processor control method.

19. A bidirectional LDC (Low DC-DC Converter) system, comprising:

a bidirectional LDC configured to:

step up a voltage of a low voltage side connected to a low voltage battery and transmit to a high voltage side connected to a high voltage battery when any one of a first synchronous rectifier and a second synchronous rectifier is turned on, and turn on a first switch of a lossless snubber circuit to perform a voltage clamping operation and a freewheeling operation when the first synchronous rectifier and the second synchronous rectifier are turned off; and a processor configured to control the first synchronous rectifier, the second synchronous rectifier, and the first switch to be turned on or off.

20. The bidirectional LDC system of claim 19, wherein the processor is configured to:

identify a switching duty of the first synchronous rectifier and the second synchronous rectifier according to a voltage of the high voltage battery and the low voltage battery, respectively, and activate the lossless snubber circuit when the switching duty is less than 0.5.

* * * * *